(12) United States Patent
Ten

(10) Patent No.: US 8,280,155 B2
(45) Date of Patent: Oct. 2, 2012

(54) MODELING SPECTRAL CHARACTERISTICS OF AN INPUT IMAGING DEVICE

(75) Inventor: Arkady Ten, Sunnyvale, CA (US)

(73) Assignee: Canon Kabushiki Kaisha, Tokyo (JP)

(*) Notice: Subject to any disclaimer, the term of this patent is extended or adjusted under 35 U.S.C. 154(b) by 957 days.

(21) Appl. No.: 12/338,925

(22) Filed: Dec. 18, 2008

(65) Prior Publication Data

US 2010/0158367 A1    Jun. 24, 2010

(51) Int. Cl.
*G06K 9/00* (2006.01)
(52) U.S. Cl. ...................................................... 382/162
(58) Field of Classification Search .................... 382/162
See application file for complete search history.

(56) References Cited

U.S. PATENT DOCUMENTS

| | | | | |
|---|---|---|---|---|
| 5,369,261 | A * | 11/1994 | Shamir | 235/469 |
| 5,991,456 | A * | 11/1999 | Rahman et al. | 382/254 |
| 6,088,095 | A | 7/2000 | Sharma | |
| 6,456,734 | B1 * | 9/2002 | Youvan et al. | 382/128 |
| 6,628,826 | B1 * | 9/2003 | Gilman et al. | 382/167 |
| 6,633,408 | B1 | 10/2003 | Rozzi | |
| 6,888,963 | B2 | 5/2005 | Nichogi | |
| 7,295,703 | B2 | 11/2007 | Bala et al. | |
| 7,336,401 | B2 | 2/2008 | Unal et al. | |
| 7,999,978 | B2 * | 8/2011 | Nakamura et al. | 358/518 |
| 2003/0053688 | A1 * | 3/2003 | Spitzer | 382/167 |
| 2007/0088535 | A1 | 4/2007 | Ten | |

OTHER PUBLICATIONS

E. Enoksson, et al., "The characterization of input devices by luminance and chrominance", 10 pages, Proc. 6th International Symposium in Graphic Arts, Pardubice, 2003.

M. Rosen, et al., "Color Management within a Spectral Image Visualization Tool", IS&T/SID Eighth Color Imaging Conference, 2000, pp. 75-80.

P. Burns, et al., "Analysis Multispectral Image Capture", IS&T, The Fourth Color Imaging Conference: Color Science, Systems and Applications, 1996, pp. 19-22.

R. Berns, et al., "Pigment Identification of Artist Materials Via Multi-Spectral Imaging", IS&T/SID Ninth Color Imaging Conference, pp. 85-90.

J. Farrell, "Spectral Based Color Image Editing (SBCIE)", IS&T, The Fourth Color Imaging Conference: Color Science, Systems and Applications, 1996, pp. 104-108.

D. Connah, et al., "Multispectral Imaging: How Many Sensor Do We Need?", Journal of Imaging Science and Technology, Jan.-Feb. 2006, pp. 45-52, vol. 50, No. 1.

(Continued)

*Primary Examiner* — Samir Ahmed
(74) *Attorney, Agent, or Firm* — Fitzpatrick, Cella, Harper & Scinto

(57) ABSTRACT

A method of modeling spectral characteristics of an input imaging device comprising includes adjusting digital values measured from a target to be linear relative to luminance of neutral patches of the target, for each channel of the input imaging device. The method further includes modifying the adjusted digital values to compensate for cross-channel interaction, for each channel of the input imaging device. In addition, the method includes converting the modified digital values to a spectrum, for each channel of the imaging device. An apparatus for modeling spectral characteristics of an input imaging device is also provided.

19 Claims, 5 Drawing Sheets

OTHER PUBLICATIONS

D. Marimont, et al., "Linear Models of Surface and Illuminant Spectra", J. Opt. Soc. Am. A, Nov. 1992, pp. 1905-1913, vol. 9, No. 11.

F.H. Imai, et al., "Spectral Reflectance of Skin Color and its Applications to Color Appearance Modeling", 4th CIC, 1996, pp. 130-133.

K. Matherson, et al., "Color Processing and its Characterization for Digital Photography, SC 870", SPIE/IST Electronic Imaging, print date Mar. 7, 2008.

* cited by examiner

MODELING SPECTRAL CHARACTERISTICS OF AN INPUT IMAGING DEVICE

BACKGROUND OF THE INVENTION

1. Field of the Invention

The invention relates to the field of input imaging devices, and m-ore particularly relates to modeling spectral characteristics of an input imaging device.

2. Description of the Related Art

Color characterization is often used to predict the color characteristics of an input imaging device. Color characterization typically refers to a process that results in a model or a profile, which models the color characteristics and properties of the input imaging device.

Characterization models can be colorimetric or spectral. In this regard, spectral modeling typically refers to characterization in a higher-dimensional spectral space. For example, spectral modeling may be associated with a spectral subspace having 6 to 13 dimensions, as opposed to more traditional color spaces with three dimensions, such as RGB (which is a device-dependent color space) or CIEXYZ (which is a device-independent color space).

A higher number of dimensions typically results in increased time and memory requirements for creation and use of spectral models.

Thus, there is a need for systems and methods for creation and use of a spectral model, with reduced time and memory requirements.

SUMMARY OF THE INVENTION

Disclosed embodiments describe systems and methods for modeling spectral characteristics of an input imaging device. Certain disclosed embodiments provide for adjusting digital values measured from a target to be linear relative to luminance of neutral patches of the target, modifying the adjusted digital values to compensate for cross-channel interaction, and converting the modified digital values to a spectrum. The adjusting, modifying and converting are performed for each channel of the imaging device.

In one aspect of the disclosure, a method of modeling spectral characteristics of an input imaging device is provided. The method includes adjusting digital values measured from a target to be linear relative to luminance of neutral patches of the target, by removing non-linear variations of the digital values, for each channel of the input imaging device. The method further includes modifying the adjusted digital values to compensate for cross-channel interaction, for each channel of the input imaging device. In addition, the method includes converting the modified digital values to a spectrum, for each channel of the imaging device.

In a further aspect of the disclosure, a computer-readable storage medium storing a computer-executable program for modeling spectral characteristics of an input imaging device is provided. The program includes code for adjusting digital values measured from a target to be linear relative to luminance of neutral patches of the target, by removing non-linear variations of the digital values, for each channel of the input imaging device. The program further includes code for modifying the adjusted digital values to compensate for cross-channel interaction, for each channel of the input imaging device. In addition, the program includes code for converting the modified digital values to a spectrum, for each channel of the imaging device.

In yet a further aspect of the disclosure, an apparatus for modeling spectral characteristics of an input imaging device is provided. The apparatus includes processing logic configured to adjust digital values measured from a target to be linear relative to luminance of neutral patches of the target, by removing non-linear variations of the digital values, for each channel of the input imaging device. The processing logic is further configured to modify the adjusted digital values to compensate for cross-channel interaction, for each channel of the input imaging device. In addition, the processing logic is configured to convert the modified digital values to a spectrum, for each channel of the imaging device.

The digital values measured from the target can be in RGB color space.

The adjusting can be performed using a linearization curve for each channel of the input imaging device. The adjusting can include obtaining the neutral patches from the target, calculating normalized values corresponding to the luminance of the neutral patches, and creating the linearization curve to map the digital values measured from the target to the normalized value.

The modifying can be performed using a multidimensional look-up table (LUT), which provides a mapping between the adjusted digital values and the modified digital values. A single LUT can be used to provide the mapping for all channels of the input imaging device. Alternatively, the channels of the input imaging device can be divided into groups, and separate LUTs can be used for each group of channels to provide the mapping therefor.

The converting can be performed using a matrix, which is determined by inverting the modified digital values. The matrix can be determined by the equation: $M=(DV')^{-1}*S$, where M represents the matrix, DV' represents a matrix of the modified digital values, and S represents a matrix with spectra for the target.

The cross-channel interaction can correspond to at least one of optical cross-talk, electrical cross-talk and processing cross-talk.

This brief summary has been provided so that the nature of this disclosure may be understood quickly. A more complete understanding can be obtained by reference to the following detailed description and to the attached drawings.

DETAILED DESCRIPTION OF THE INVENTION

Figure 1:
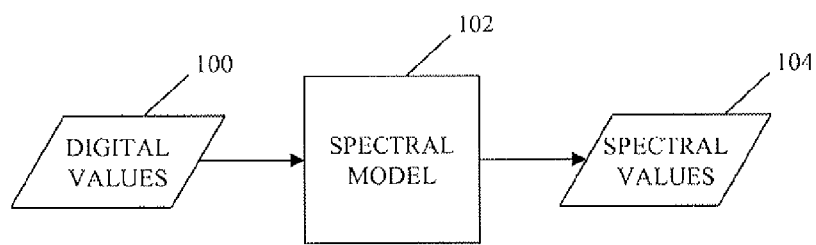
FIG. 1 is a block diagram illustrating an example of a spectral model which can be used for modeling spectral characteristics of an input imaging device.

FIG. 1 is a block diagram illustrating an example of a spectral model which can be used for modeling spectral characteristics of an input imaging device. For example, the input imaging device can be a digital camera (e.g., a consumer level based camera) or a scanner.

For input imaging devices such as digital cameras, the high dimensionality of spectral space can typically be limited by several factors. For example, one major factor is that an application-specific subset of spectra typically covers only part of the whole spectral space.

As a result, an application typically only requires 6 to 13 dimensions to cover all probable spectra for the application. Generally, in order to have a unique relation between a multichannel image and a spectral image, the number of dimensions of the application-specific spectra subspace should equal the number of independent channels in the input imaging device. For example, a 6 to 13 channel input imaging device may suffice for many medical, industrial and scientific applications.

In this regard, the smaller number of required channels allows for use of trichromatic digital cameras. For example, trichromatic digital cameras equipped with color or band filters can be capable of producing a sufficient number of independent channels to allow for reconstruction of a spectral image.

A typical multi-channel equipment set consists of a digital camera and one or more color or band filters. Using this equipment set, a training target or a scene can be captured with every filter, and additional capture can made without filtering. This typically results in N+1 digital images (e.g., RGB images), which can be combined into a 3*(N+1) channel image. The captured multi-channel image can then be mapped into a spectral image by a multi-spectral capture model (MSCM).

In general, building an MSCM (e.g., which can correspond with spectral model 102) involves three steps. First, a spectral subspace which spans the training target spectra is found using, for example, principle component analysis. The second step involves encoding the target spectra in the found subspace having reduced dimensionality. In the third step, a mapping is determined between the encoded values and the digital values. In other words, basis spectral vectors are found which span a training set of patches in the first step, coefficients which represent the spectra of the training patches in the newly found basis are found in the second step, and a linear mapping (e.g., interpolation) is constructed between the coefficients and digital values in the third step. In general, this three-step process involves solving one eigenvector problem and two matrix conversions (or optimizations).

Once a model (e.g., MSCM) has been built, the spectral mapping itself generally involves two steps. First, multichannel digital values are mapped to coefficients of spectral subspace. Second, the coefficients are multiplied by basis spectra of the spectral subspace. In other words, the second step can involve reconstructing spectra using basis spectral vectors and coefficients.

Thus, as described above, it generally takes three stages to build a model (e.g., MSCM), and two stages to use the model to perform spectral mapping. Given the number of pixels and wavelengths in spectra, these stages can be both time consuming and memory consuming.

Spectral model 102 can correspond with an MISCM. Spectral model 102 receives digital values 100 in device-dependent color space for each color channel (e.g., ROB) of the input imaging device. Based on digital values 100, spectral model 102 can produce spectral values 104. Spectral values 104 can correspond to a spectrum. As will be described later, spectral model 102 of FIG. 1 may be configured as shown in FIG. 2, to improve time and memory requirements.

In addition to modeling spectra of input imaging devices, spectral model 102 can also be used within a color management framework. For example, the predicted spectrum (or spectral values) for an input imaging device may be output from spectral model 102 to a color management module (CMM, not shown). A CMM typically facilitates color matching between destination (or output) imaging devices and source (or input) imaging devices. Spectral model 102 may be used in building International Color Consortium (ICC) profiles, and the characterization and calibration of imaging devices.

Figure 2:
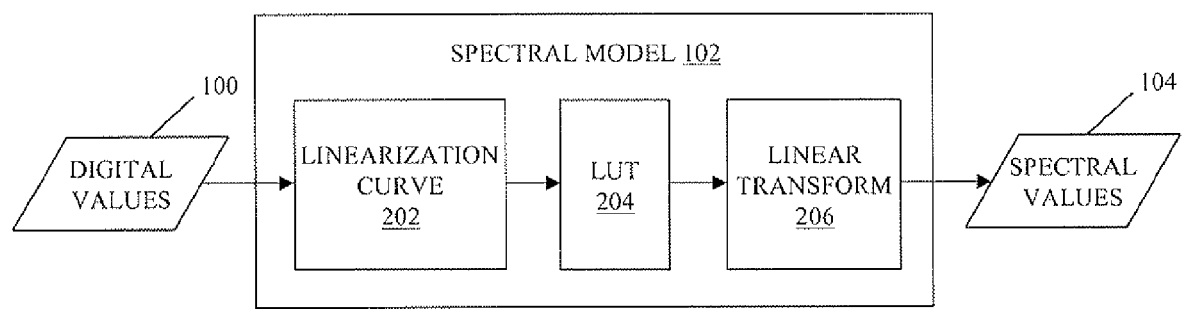
FIG. 2 is a block diagram illustrating an exemplary configuration for the spectral model of FIG. 1, to model spectral characteristics of an input imaging device.

FIG. 2 is a block diagram illustrating an exemplary configuration for the spectral model of FIG. 1, to model spectral characteristics of an input imaging device. Spectral model 102 can include a linearization curve 202 to account for small non-linearity of a sensor, an LUT 204 to account for cross-channel talk, and a linear transform 206 to provide direct conversion of digital values to a spectrum.

In this regard, most digital camera sensors are linear (or virtually linear) devices. Thus, there typically is a linear mapping operator (hereinafter M) between digital values and spectra. For example, A can correspond to linear transform 206 of FIG. 2.

If S is a matrix that contains spectra for training patches arranged in columns, then S typically should be related to the digital values formed into columns of matrix D as follows:

$$S = M * D \qquad \text{Equation (1)}$$

As such, the operator M can be found by:

$$M = (D^T)^{-1} * S \qquad \text{Equation (2)}$$

This requires one matrix inversion to create an MSCM, which in this case is a simple matrix operator. Moreover, as suggested above, the effective dimensionality of the spectral subset characteristic for an application can range from 6 to 13. Further, the required number of patches is typically equal to the dimension of the spectral data. A similar result can theoretically be achieved with a smaller number of training patches. As such, rather than using 240 patches of a training target (e.g., ColorChecker DC target), a smaller number of patches can be used without necessarily losing accuracy. In this regard, the patches' spectra should to be linearly independent, and the selection of training patches can be based accordingly.

Regarding Equations (1) and (2), the inversion of D can be performed several ways. For example, singular value decomposition (SVD) can be used, since the matrices may not be square. However, other inversion algorithms may be used. It should be noted that in case of selection of representative patches, the matrices will generally be square, thus simplifying inversion. Further, once the mapping operator M is found, a multichannel image can be converted to a spectral image by matrix multiplication, as demonstrated by Equation (1).

Still referring to FIG. 2, accuracy may be improved by correcting non-linearities of the channels of the input imaging device (e.g., camera) by introducing a linearization curve, such as the one depicted by element 202. It should be noted that linearization curve 202 can also be referred to as a tone reproduction curve (TRC). Linearization curve 202 can account for small non-linearity of a sensor, such as in camera electronics and post-processing. An example of nonlinear behavior can be seen on FIG. 3, which is described in greater detail below.

As suggested above, linearization curve 202 can compensate for the non-linear relation between digital values and the intensity of light (e.g., reflectance of the surface of the target), and can be represented by the equation:

$$D' = TRC(D) \qquad \text{Equation (3)}$$

where TRC is a set of one-dimensional mapping functions for per-channel transformation. As such, a spectral model which incorporates the linearization curve 202 can be associated with the following:

$$S=M*D'$$ Equation (4A)

$$M=(D'^T)^{-1}*S$$ Equation (4B)

In addition to compensation for effects captured by linear transform 206 and linearization curve 202, inter channel contamination and/or hardware imperfection, which typically causes a digital value of one channel to affect digital values of other channels, can be compensated for. This compensation can be done by a look-up-table (LUT), such as LUT 204 of FIG. 2. More particularly, LUT 204 can account for cross-channel talk, which includes optical, electrical and processing cross-talk of the input imaging device (e.g., digital camera).

Optical cross talk typically results from defocusing properties of the lens and light leakage from neighboring sensors. For example, light which passes through a filter of a red sensor can hit surrounding green and blue sensors.

Electrical cross-talk, on the other hand, typically results from charge leakage from one sensor to another and/or from the electromagnetic field of one sensor inducing error in neighboring sensors.

Processing cross talk typically results from interpolation and sharpening applied by in-camera or post processing software/hardware. For example, some input imaging devices are based on distinct red, green and blue sensors located in different positions. On the other hand, an RGB value in common image file formats is given for a single location. Thus, separated in sensor plane red, green and blue values may need to be recalculated to a single location. This typically involves interpolation procedures which often result in cross-channel contamination.

Building LUT 204 to account for the different types of cross-talk can involve optimization or/and inversion procedures. LUT 204 can provide mapping between original channel values and corrected channel values. The correction can account for the cross-talk phenomena by adjusting channel values. For example, to build LUT 204, measured color target spectra can be multiplied by the inverted conversion matrix, resulting in device modified values DV", LUT 204 can be built to map the adjusted DV' into the modified values DV'", by re-gridding DV' to the LUT grid and populating the LUT nodes with the re-gridded DV" values.

For example, for a highly chromatic red patch, red channels of the input imaging device may introduce a change in digital values for neighboring green and blue channels. This change can be compensated for by LUT 204. LUT 204 may map three channels into three channels (e.g., for RGB capture devices). Alternatively, in cases of significant cross talk, LUT 204 may require more accurate correction and thus, a specific LUT can be used for every filter, or a single higher dimensional LUT may be employed to map all digital values (filtered and unfiltered) to perform the correction. In cases where cross-talk is insignificant, LUT 204 may be disregarded (or removed) from spectral model 204.

Thus, spectral model 102 can include a linearization curve 202 to account for small non-linearity of a sensor, an LUT 204 to account for cross-channel talk, and a linear transform 206 to provide direct conversion of digital values to a spectrum.

Further, matrix formulation can allow for easier implementation of typical spectral processes. The matrix formulation can allow for easier changes of a light source and for easier calculation of tristimulus values. For example, re-rendering a model to a different light source can be reduced to simple matrix multiplication, as follows:

$$M^{new}=\text{diag}(I^{new})\text{diag}(1/I^{old})*M^{old}$$ Equation (5)

where $I_{new}$ and $I_{old}$ are new and old light source spectra, respectively. Further, the spectral radiances can be converted to CIE XYZ values for further color processing, using matrix multiplication.

Figure 3:
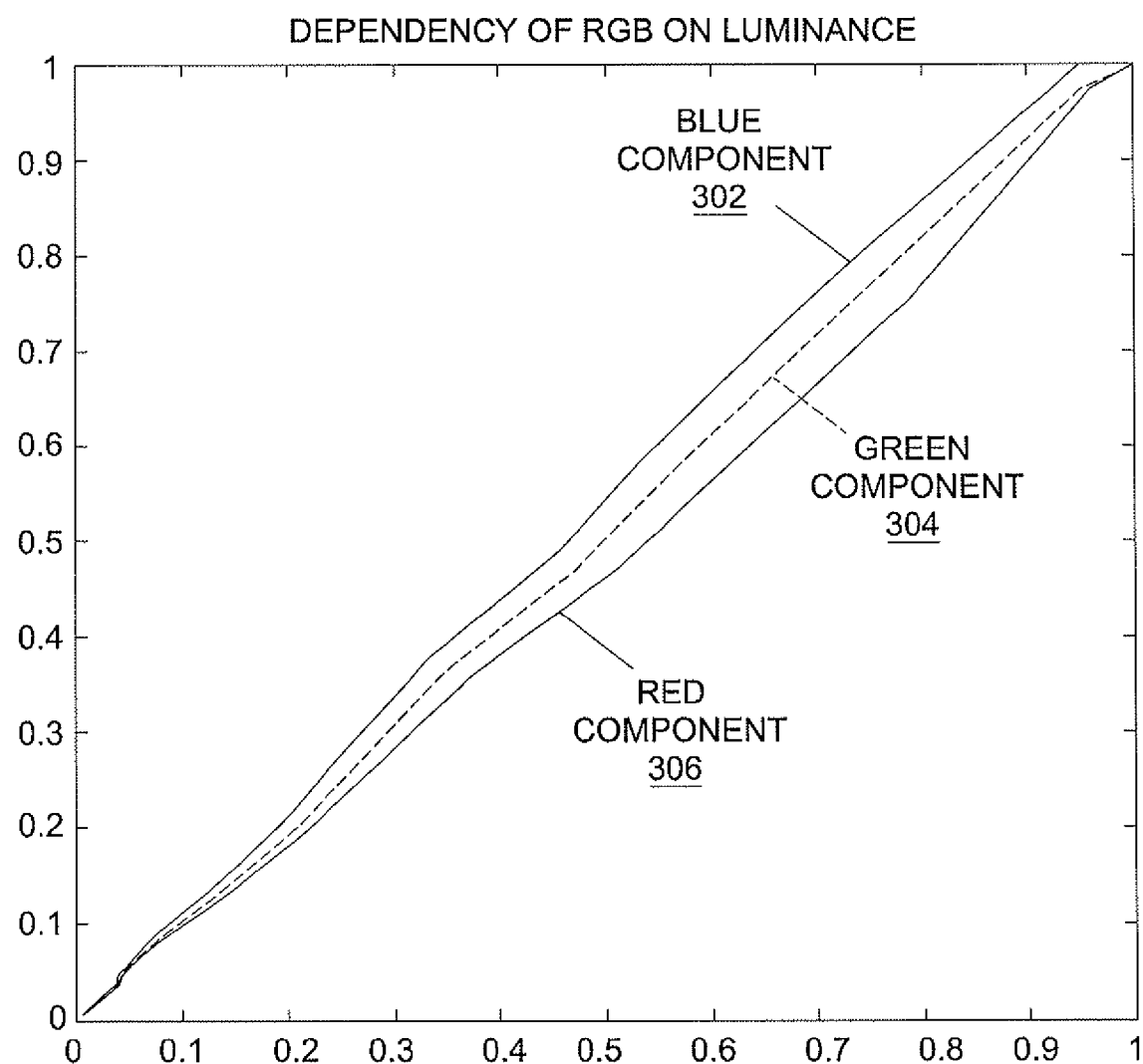
FIG. 3 is a graph illustrating an example of the dependency for each channel (e.g., RGB) on luminance for an input imaging device.

FIG. 3 is a graph illustrating an example of the dependency for each channel (e.g., red, green and blue) on luminance for an input imaging device. As can be seen in FIG. 3, the luminance of measured achromatic patches may not be linearly related to RGB values (e.g., red component 306, green component 304 and blue component 302).

However, a spectral model (e.g., spectral model 102) typically expects a linear relation between luminance and camera response (RGB). In other words, if a color patch is illuminated by a brighter light, spectral model 102 typically expects the corresponding RGB values to be proportionally greater. As described above, linearization curve 202 of FIG. 2 can account for such non-linearity. Moreover, normalized measured luminance of achromatic patches can be used for correction.

In this regard, neutral (or gray) patches can be used to create linearization curve 202. More specifically, neutral patches can be located on a target. A value Y (or X or Z) can be normalized to I. A linearization curve 202 can then be created that maps R, C and B to Y*max(R), Y*max(G) and Y*max(B), which results in a mapping that is linear relative to measured values of the target.

Further, if $f_i$ is the measured curve for an input imaging device (e.g., camera) channel i, then correction can be performed according to:

$$V'_i=f_i(V_i)$$ Equation (6)

where $V_i$ denotes original digital value of channel i and $V'_i$ is a linearized digital value. The implementation of such transformation is typically done through a one-dimensional look up table with or without interpolation in order to simulate mapping function $f_i$.

As can be seen in FIG. 3, the model for linearization curve correction can use three linearization curves, one for each physical channel. Filter usage does not typically affect the curves and thus, the same curves can be used for linearization of both filtered and unfiltered captures. However, in case where linearization curves exhibit significant dependence on filters, then a set of specific linearization curves may be used for every filter.

Figure 4:
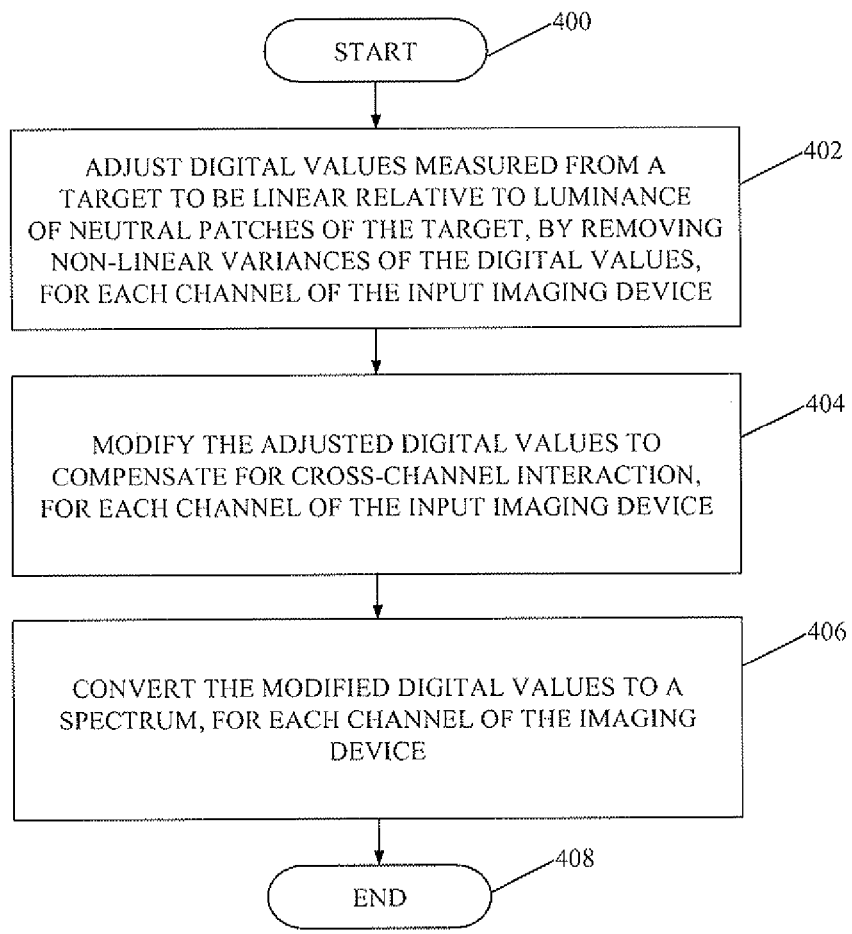
FIG. 4 is a flowchart illustrating an example of modeling spectral characteristics of an input imaging device.

FIG. 4 is a flowchart illustrating an example of modeling spectral characteristics of an input imaging device. Following start bubble 400, digital values measured from a target are adjusted to be linear relative to luminance of neutral patches of the target, by removing non-linear variations of the digital values, for each channel of the input imaging device (block 402). The adjusted digital values are modified to compensate for cross-channel interaction, for each channel of the input imaging device (block 404). The modified digital values are converted to a spectrum, for each channel of the imaging device (block 406), and the process ends (end bubble 408).

Figure 5:
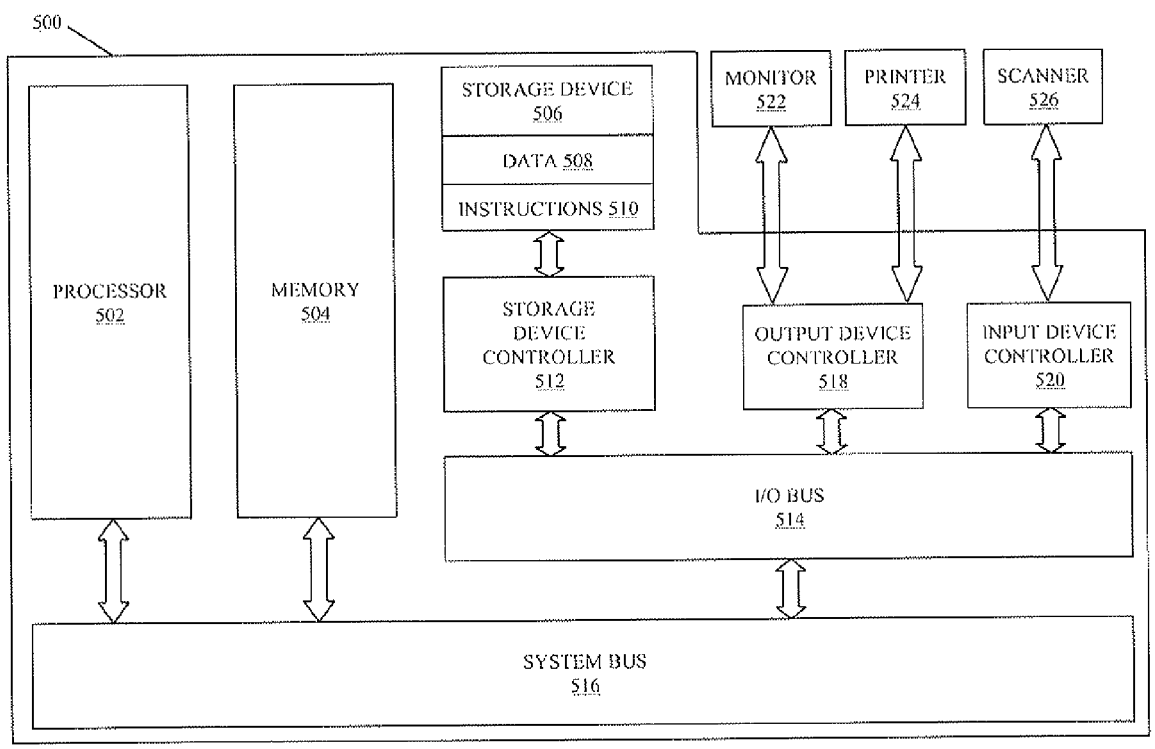
FIG. 5 is an architecture diagram for a data processing apparatus, such as a general purpose computing machine, suitable for hosting a process for modeling spectral characteristics of an input imaging device in accordance with aspects of this disclosure.

FIG. 5 is an architecture diagram for a data processing apparatus, such as a general purpose computing machine, suitable for hosting a process for modeling spectral characteristics of an input imaging device in accordance with representative embodiments. The data processing system 500 includes a processor 502 coupled to a memory 504 via system bus 516. The processor 502 is also coupled to external Input/Output (I/O) devices via the system bus 516 and an I/O bus 514. A storage device 506 having computer system readable media is coupled to the processor 502 via a storage device controller 512, the I/O bus 514 and the system bus 516. The storage device 506 is used by the processor 502 to store and read data 508 and program instructions 510 used to implement the modeling of spectral characteristics of an input imaging device as described above. The processor 502 may be further coupled to color output devices, such as computer display 522 and color printer 524, via an output device controller 518 coupled to the I/O bus 514. The processor 502 may also be coupled to a color input device 526, such as a digital camera or a color scanner, via an input device controller 520.

In operation, the processor 502 loads the program instructions from the storage device 506 into memory 504. The processor 502 then executes the loaded program instructions 510 to perform modeling spectral characteristics of an input imaging device, as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method of modeling spectral characteristics of an input imaging device, the method comprising:
adjusting digital values measured from a target to be linear relative to luminance of neutral patches of the target, by removing non-linear variations of the digital values, for each channel of the input imaging device;
modifying the adjusted digital values to compensate for cross channel interaction, for each channel of the input imaging device; and
converting the modified digital values to a spectrum, for each channel of the input imaging device, using a matrix which is determined based on the modified digital values and spectra for the target.

2. A method according to claim 1, wherein the digital values measured from the target are in RGB color space.

3. A method according to claim 1, wherein the adjusting is performed using a linearization curve for each channel of the input imaging device.

4. A method according to claim 3, wherein the adjusting comprises:
obtaining the neutral patches from the target;
calculating normalized values corresponding to the luminance of the neutral patches; and
creating the linearization curve to map the digital values measured from the target to the normalized value.

5. A method according to claim 1, wherein the modifying is performed using a multidimensional look up table (LUT), which provides a mapping between the adjusted digital values and the modified digital values.

6. A method according to claim 5, wherein a single LUT provides the mapping for all channels of the input imaging device.

7. A method according to claim 5, wherein the channels of the input imaging device are divided into groups, and wherein separate LUTs are used for each group of channels to provide the mapping therefor.

8. A method according to claim 1, wherein the matrix is determined by the equation:

$$M = (DV')^{-1} * S$$

where M represents the matrix, DV' represents a matrix of the modified digital values, and S represents a matrix with spectra for the target.

9. A method according to claim 1, wherein the cross channel interaction corresponds to at least one of optical cross talk, electrical cross talk and processing cross talk.

10. A non-transitory computer-readable storage medium storing a computer-executable program for modeling spectral characteristics of an input imaging device, the program comprising code for:
adjusting digital values measured from a target to be linear relative to luminance of neutral patches of the target, by removing non-linear variations of the digital values, for each channel of the input imaging device;
modifying the adjusted digital values to compensate for cross channel interaction, for each channel of the input imaging device; and
converting the modified digital values to a spectrum, for each channel of the input imaging device, using a matrix which is determined based on the modified digital values and spectra for the target.

11. A computer-readable storage medium according to claim 10, wherein the digital values measured from the target are in RGB color space.

12. A computer-readable storage medium according to claim 10, wherein the adjusting is performed using a linearization curve for each channel of the input imaging device.

13. A computer-readable storage medium according to claim 12, wherein the adjusting comprises code for:
obtaining the neutral patches from the target;
calculating normalized values corresponding to the luminance of the neutral patches; and
creating the linearization curve to map the digital values measured from the target to the normalized value.

14. A computer-readable storage medium according to claim 10, wherein the modifying is performed using a multi-dimensional look up table (LUT), which provides a mapping between the adjusted digital values and the modified digital values.

15. A computer-readable storage medium according to claim 14, wherein a single LUT provides the mapping for all channels of the input imaging device.

16. A computer-readable storage medium according to claim 14, wherein the channels of the input imaging device are divided into groups, and wherein separate LUTs are used for each group of channels to provide the mapping therefor.

17. An apparatus for modeling spectral characteristics of an input imaging device, the apparatus comprising:
a storage device which stores computer-executable program instructions; and
a processor coupled to the storage device and constructed to execute the computer-executable program instructions stored in the storage device;
wherein the computer-executable program instructions stored in the storage device comprise instructions to:
adjust digital values measured from a target to be linear relative to luminance of neutral patches of the target, by removing non-linear variations of the digital values, for each channel of the input imaging device;
modify the adjusted digital values to compensate for cross channel interaction, for each channel of the input imaging device; and
convert the modified digital values to a spectrum, for each channel of the imaging device, using a matrix which is determined based on the modified digital values and spectra for the target.

18. An apparatus according to claim 17, wherein the digital values measured from the target are in RGB color space.

19. An apparatus according to claim 17, wherein the matrix is determined by the equation:

$$M = (DV')^{-1} * S$$

where M represents the matrix, DV' represents a matrix of the modified digital values, and S represents a matrix with spectra for the target.

* * * * *